US010533894B2

(12) United States Patent
Seyfried et al.

(10) Patent No.: US 10,533,894 B2
(45) Date of Patent: Jan. 14, 2020

(54) MICROSCOPE AND ACOUSTO-OPTIC BEAM COMBINER FOR A MICROSCOPE

(71) Applicant: LEICA MICROSYSTEMS CMS GMBH, Wetzlar (DE)

(72) Inventors: Volker Seyfried, Nussloch (DE); Vishnu Vardhan Krishnamachari, Seeheim-Jugenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 848 days.

(21) Appl. No.: 14/916,502

(22) PCT Filed: Sep. 3, 2014

(86) PCT No.: PCT/EP2014/068748
§ 371 (c)(1),
(2) Date: Mar. 3, 2016

(87) PCT Pub. No.: WO2015/032820
PCT Pub. Date: Mar. 12, 2015

(65) Prior Publication Data
US 2016/0209270 A1    Jul. 21, 2016

(30) Foreign Application Priority Data

Sep. 3, 2013   (DE) .................... 10 2013 217 497
Dec. 23, 2013  (DE) .................... 10 2013 227 105

(51) Int. Cl.
*G01J 3/12*    (2006.01)
*G02B 21/00*   (2006.01)
*G02B 27/28*   (2006.01)

(52) U.S. Cl.
CPC ........ *G01J 3/1256* (2013.01); *G02B 21/0032* (2013.01); *G02B 21/0064* (2013.01); *G02B 27/283* (2013.01)

(58) Field of Classification Search
CPC .............. G01J 3/1256; G02B 21/0032; G02B 21/0064; G02B 21/0068; G02B 27/283
See application file for complete search history.

(56) References Cited

U.S. PATENT DOCUMENTS

| 5,210,643 A | 5/1993 | Fujii et al. |
| 6,525,812 B1 | 2/2003 | Hartmann et al. |
| (Continued) | | |

FOREIGN PATENT DOCUMENTS

| DE | 19633185 A1 | 10/1997 |
| DE | 19906757 A1 | 12/1999 |
| WO | 0039545 A1 | 7/2000 |

OTHER PUBLICATIONS

Thomas J Fellers: "Olympus Fluoview Resource Center: Acousto-Optic Tunable Filters" Mar. 19, 2013, https://web.archive.org/web/20130319085942/http://www.olympusconfocal.com/theory/aotfintro.html.

*Primary Examiner* — Georgia Y Epps
*Assistant Examiner* — Don J Williams
(74) *Attorney, Agent, or Firm* — Hodgson Russ LLP

(57) ABSTRACT

The invention relates to a beam combiner for a microscope, in particular a scanning microscope, which receives at least a first illuminating light bundle and a second illuminating light bundle and combines them into a collinear output light bundle, the first illuminating light bundle and the second illuminating light bundle having the same illuminating light wavelength but a different polarization, in particular linear polarization. The beam combiner is embodied as an acousto-optic beam combiner and is constructed and operated in such a way that by interaction with at least one mechanical wave, both the first illuminating light bundle and the second illuminating light bundle are diffracted and are thereby directed into a common optical axis.

20 Claims, 7 Drawing Sheets

(56) References Cited

U.S. PATENT DOCUMENTS

| | | |
|---|---|---|
| 6,737,635 B2 | 5/2004 | Engelhardt et al. |
| 8,259,383 B2* | 9/2012 | Seyfried ............ G02B 21/0032 359/290 |
| 2003/0107732 A1 | 6/2003 | Sasaki et al. |
| 2007/0070348 A1 | 3/2007 | Seyfried |
| 2011/0304900 A1 | 12/2011 | Widzgowski et al. |
| 2015/0013035 A1* | 1/2015 | Humphris .............. G01Q 20/02 850/1 |

\* cited by examiner

MICROSCOPE AND ACOUSTO-OPTIC BEAM COMBINER FOR A MICROSCOPE

The invention relates to a beam combiner for a microscope, in particular a scanning microscope, which receives at least a first illuminating light bundle and a second illuminating light bundle and combines them into a collinear output light bundle, the first illuminating light bundle and the second illuminating light bundle having the same illuminating light wavelength but a different polarization, in particular linear polarization.

The invention furthermore relates to a microscope having such an acousto-optic beam combiner, and to the use of such an acousto-optic beam combiner in the context of illumination of a sample.

In a microscope, in particular in a scanning microscope or a confocal scanning microscope, samples are often illuminated with an illuminating light bundle that has been generated by combining multiple illuminating light bundles, in order to observe the reflected or fluorescent light emitted from the illuminated sample.

In scanning microscopy, for example, the focus of such an illuminating light bundle is moved in a specimen plane with the aid of a controllable beam deflection device, generally by tilting two mirrors; the deflection axes are usually perpendicular to one another, so that one mirror deflects in an X direction and the other in a Y direction. Tilting of the mirrors is brought about, for example, with the aid of galvanometer positioning elements. The power level of the light coming from the specimen is measured as a function of the position of the scanning beam. The positioning elements are usually equipped with sensors for ascertaining the current mirror position.

In confocal scanning microscopy in particular, a specimen is scanned in three dimensions with the focus of an illuminating light bundle. A confocal scanning microscope generally encompasses a light source, a focusing optical system with which the light of the source is focused onto an aperture (called the "excitation pinhole"), a beam splitter, a beam deflection device for beam control, a microscope optical system, a detection pinhole, and the detectors for detecting the detected light or fluorescent light. The illuminating light is coupled in, for example, via a beam splitter.

The fluorescent light coming from the specimen travels via the beam deflection device back to the beam splitter, passes through the latter, and is then focused onto the detection pinhole behind which the detectors are located. Detected light that does not derive directly from the focus region takes a different light path and does not pass through the detection pinhole, so that a spot information item is obtained which results, by sequential scanning of the specimen, in a three-dimensional image.

Dichroic beam splitters are usually used in the optical system in order to combine light bundles having different wavelengths. DE 196 33 185 A1, for example, discloses a point light source for a laser scanning microscope and a method for coupling the light of at least two lasers having different wavelengths into a laser scanning microscope. The point light source is of modular configuration and contains a dichroic beam combiner that combines the light of at least two laser light sources and couples it into a light-guiding fiber leading to the microscope.

Arrangements based on dichroic beam splitters have the disadvantage that they are defined for specific wavelengths, and changing is consequently possible only with difficulty, namely by exchanging the dichroic beam splitters.

EP 165 65 78 A1 discloses an optical apparatus for collinear combination of light beams having different wavelengths. This apparatus contains a dispersive element and an imaging optical system that define a dividing plane in which a location is associated with each light wavelength. Arranged in the dividing plane is a microstructured element that directs the light beams, coming from different directions and focused onto the locations corresponding to their wavelengths, via the imaging optical system to the dispersive element that collinearly combines the light beams. The apparatus is, however, technically very complex, especially including in terms of alignment, and does not permit very fast switching times.

EP 215 85 13 A1 discloses a beam combiner for combining at least two light beams into one combined light beam, in particular in the beam path of an optical arrangement, preferably of a microscope. The beam combiner is characterized by an acousto-optic element in which a mechanical wave can be generated in order to deflect or diffract light beams, so that a first light beam entering the acousto-optic element and at least one second light beam entering the acousto-optic element leave the acousto-optic element collinearly with one another as a combined light beam. This document does not disclose the combining of light beams having the same wavelength but different polarization.

Combining light beams with the aid of polarizing beam splitters is also known from EP 0 473 071 B1. Such an arrangement turns out, however, to be as inflexible in use, specifically involving the replacement of essential components, as apparatuses having dichroic beam splitters.

The object of the present invention is therefore to describe a beam combiner that permits the combination of illuminating light bundles having the same wavelength but a different polarization, and that can be adapted simply and quickly to modified illumination requirements.

The object is achieved by a beam combiner which is characterized in that the beam combiner is embodied as an acousto-optic beam combiner and is constructed and operated in such a way that by interaction with at least one mechanical wave, both the first illuminating light bundle and the second illuminating light bundle are diffracted and are thereby directed into a common optical axis.

The beam combiner according to the present invention has the very particular advantage that the acousto-optic beam combiner can be switched very quickly, within a few microseconds. An illuminating light bundle can thereby, for example, be quickly interrupted or enabled again. The possibility of a rapid switchover to other wavelengths or other wavelength combinations is also a particular advantage of the beam combiner according to the present invention.

The manner of operation of an acousto-optic beam combiner of this kind is based substantially on the interaction of the incoupled illuminating light bundles with a mechanical wave or with multiple mechanical waves.

Acousto-optic components are generally made up of a so-called acousto-optic crystal, on which is mounted an electrical converter (often referred to in the literature as a "transducer"). The converter usually encompasses a piezoelectric material as well as one electrode located above it and one located below it. Electrical activation of the electrodes with radio frequencies, which are typically in the region between 30 MHz and 800 MHz, causes the piezoelectric material to vibrate, so that an acoustic wave (i.e. a sound wave) can occur and, once produced, passes through the crystal. After passing through an optical interaction region, the acoustic wave is usually absorbed or reflected away at the oppositely located side of the crystal.

Acousto-optic crystals are notable for the fact that the resulting sound wave modifies the optical properties of the crystal, a kind of optical grating or comparable optically active structure, for example a hologram, being induced by the sound. Light passing through the crystal experiences a diffraction at the optical grating. The light is correspondingly directed into various diffraction orders in diffraction directions. There are acousto-optic components that influence all of the incident light more or less irrespective of wavelength. Reference may be made, solely by way of example, to components such as AOMs, AODs, and frequency shifters. Components moreover also already exist that, for example, act selectively on individual wavelengths as a function of the irradiated radio frequency (AOTFs). The acousto-optic elements are often made of birefringent crystals, for example tellurium oxide; the optical effect of the respective element is determined in particular by the location of the crystal axis relative to the incidence direction of the light and its polarization.

Especially when, for example, an AOTF is used in the acousto-optic beam combiner, the mechanical wave must have a very specific frequency so that the Bragg condition is exactly satisfied for light having the desired illuminating light wavelength and the desired polarization. In these acousto-optic components, light for which the Bragg condition is not satisfied is not deflected by the mechanical wave.

In a particularly simple embodiment of a beam combiner according to the present invention, in which the latter can contain, for example, a commercially usual AOTF, the acousto-optic beam combiner comprises a crystal through which a first and a second mechanical wave having different acoustic frequencies propagate simultaneously, the crystal and the propagation direction of the mechanical waves being oriented, relative to one another and respectively relative to the illuminating light bundles incident into the crystal, in such a way that the first illuminating light bundle is diffracted at the first mechanical wave and the second illuminating light bundle at the second mechanical wave, and they are thereby directed into a common optical axis.

It is particularly advantageous in this context if the combined illuminating light bundle leaves the crystal through an exit surface oriented perpendicularly to the propagation direction of the illuminating light bundle. Directional changes or a spatial division of the illuminating light bundle do not occur upon a change in wavelength or if if the illuminating light bundle comprises multiple wavelengths.

This embodiment has the disadvantage, however, that two different mechanical waves must be generated in order to deflect two illuminating light bundles that have the same wavelength but a different polarization. The generator for the mechanical waves, for example a piezoelement arranged on the crystal, must thus be impinged upon simultaneously by two different electromagnetic HF waves. The result, disadvantageously, is that twice the amount of thermal power is introduced into the crystal or crystals, which ultimately reduces the diffraction efficiency and, because of the unavoidable temperature fluctuations, also causes the deflection directions and thus the light power levels of the light arriving at the sample and at the detector to fluctuate. "Beat" phenomena can also occur if the frequency ranges of the mechanical waves overlap, ultimately resulting in periodic fluctuations in the light power level of the light arriving at the sample and/or at the detector. This problem is based in particular on the fact that the mechanical waves by their nature cannot have an infinitesimally small, i.e. singular, acoustic frequency, but instead that a frequency range around a center frequency must always be present.

In a very particularly advantageous embodiment, a commercially usual AOTF is therefore not used. The acousto-optic beam combiner instead comprises a crystal through which a mechanical wave having an acoustic frequency associated with the wavelength of the first and of the second illuminating light bundle propagates, the crystal and the propagation direction of the mechanical wave being oriented, relative to one another and respectively relative to the illuminating light bundles incident into the crystal, in such a way that both the first illuminating light bundle and the second illuminating light bundle are diffracted at the mechanical wave and are thereby directed into a common optical axis.

Provision can be made here in particular that the first illuminating light bundle is linearly polarized and has a linear polarization direction that is the linear polarization direction of the ordinary light with respect to a birefringence property of the crystal; and/or that the second illuminating light bundle is linearly polarized and has a linear polarization direction that is the linear polarization direction of the extraordinary light with respect to a birefringence property of the crystal. Provision can also be made, in particular, that the linear polarization direction of the first illuminating light bundle or the linear polarization direction of the second illuminating light bundle is arranged in the plane that is spanned by the propagation direction of the mechanical wave and the propagation direction of the detected light bundle.

The specific configuration of an acousto-optic beam combiner of this kind, in particular the orientation of the crystal relative to the propagation direction of the mechanical wave(s) and to the propagation direction of the illuminating light bundles, and the orientation of the mechanical wave and the illuminating light bundles relative to one another, as well as the orientation of the entrance and exit surfaces with respect to one another and to the optical axis of the crystal, can be developed, for example, in accordance with the iterative method discussed below; preferably the method is pursued not on the basis of real components (although that would also be possible) but instead in a computer simulation, until the individual parameters of crystal shape, orientation of the surfaces and of the crystal lattice, orientation of the propagation direction of the mechanical wave(s), and propagation directions of the illuminating light bundles, conform to the desired requirements. When all the relevant parameters have been ascertained in this manner in a computer simulation, the crystal can then be manufactured in a further step.

It is possible to proceed in this context, for example, firstly from the embodiment that is described above and in which the acousto-optic beam combiner comprises a commercially usual crystal, through which a first and a second mechanical wave of different acoustic frequencies would actually need to propagate simultaneously in order to direct both the first illuminating light bundle and the second illuminating light bundle into a common optical axis.

The reverse light path is considered for the iteration method; and on the reverse light path the first and the second illuminating light bundle are collinearly coupled through the (preferably perpendicularly oriented) exit surface into the crystal, but only the first of the mechanical waves is generated in the crystal. The consequence of this is that only the first illuminating light bundle is diffracted at the mechanical wave, while the second light bundle, which has the same wavelength but the other linear polarization direction, passes undeflected through the crystal.

The crystal is then rotated, preferably in the plane that is spanned by the incident collinear illuminating light bundle and the propagation direction of the mechanical wave, and the angle between the propagation direction of the mechanical wave and the crystal axes is thus also modified, until both illuminating light bundles having both linear polarization portions are deflected by the mechanical wave.

The result of the rotation is generally, however, that the exit surface is no longer perpendicular to the incident collinear illuminating light bundle. For this reason, in a next iteration step the shape of the crystal is modified—without rotating the crystal—in such way that the exit surface is once again perpendicular to the incident collinear illuminating light bundle.

The result of the changes in the crystal shape is generally, however, that both linear polarization portions having the illuminating light wavelength can no longer each be deflected with the mechanical wave. For this reason, the crystal is then rotated again until this condition is again satisfied. The further iteration steps already described are then repeated.

A sufficient number of iteration cycles are carried out until the condition of simultaneous deflection of both linear polarization portions, and the condition of collinear light exit, are satisfied. As a rule the method converges very quickly, so that the goal is reached after a few iteration cycles.

In a particular embodiment, care is respectively taken upon rotation of the crystal that with respect to one of the linear polarization directions of the illuminating light proceeding in reverse, all of the light that is diffracted into the first order, and that has the illuminating light wavelengths, exits the crystal collinearly. Such an embodiment has the advantage not only that both portions having a different linear polarization can respectively be deflected with a single mechanical wave, but also that multi-colored collinearly incident illuminating light can additionally be diffracted collinearly into an illuminating light beam path via the light path of the first diffraction order, for which the above-described collinearity exists. Advantageously, no compensation for spatial divisions is required for this illuminating light, since they do not exist for this illuminating light.

With such an embodiment provision can be made, for example, that the crystal or the second crystal comprises an entrance surface for primary light having multiple wavelengths and an exit surface for the illuminating light bundle directed into the common optical axis, the entrance surface and exit surface being oriented with respect to one another in such a way that the primary light is incouplable into the crystal as a collinear illuminating light bundle, and the illuminating light bundle directed into the common optical axis leaves the crystal as a collinear illuminating light bundle.

In an advantageous embodiment provision is made that at least one further illuminating light bundle, which does not have the wavelength of the first and second illuminating light bundle and is not diffracted at the mechanical wave, proceeds through the crystal and travels, together with the first and the second illuminating light bundle, into the common optical axis. Such an embodiment makes it possible in particular to arrange multiple acousto-optic components successively, as described below in detail.

Provision can be made, for example, for the further illuminating light bundle to emerge from a second crystal in which a second mechanical wave, which has an acoustic frequency associated with the wavelengths having the further illuminating light bundle, propagates, the further illuminating light bundle containing a third illuminating light bundle having the further illuminating light wavelength, which is diffracted by the second mechanical wave; or that the further illuminating light bundle contains a third and a fourth illuminating light bundle having the further illuminating light wavelength but a different polarization, in particular linear polarization, which have been diffracted by the second mechanical wave. In order to implement the latter variant the second crystal should preferably be constructed so that, as discussed in detail above, it deflects the illuminating light having the further wavelength irrespective of its polarization.

As already discussed, provision can advantageously be made that the previously mentioned principles are simultaneously applied in multiple fashion, by the fact that multiple mechanical waves of different frequencies, for illuminating light having different wavelengths, are generated in at least one crystal.

Provision can be made, for example, that at least one additional mechanical wave, which has another acoustic frequency associated with an additional wavelength, simultaneously propagates in the crystal or in the second crystal, at least one additional illuminating light bundle, which has the other wavelength, being diffracted at the additional mechanical wave and thereby being directed into the common optical axis; and/or two additional illuminating light bundles, which have the other wavelength and a polarization, in particular a linear polarization, different from one another, being diffracted at the additional mechanical wave and being thereby directed into the common optical axis.

In a particular embodiment the acousto-optic beam combiner comprises at least one dispersive optical component that compensates for a spatial spectral division produced (at least in part) by the crystal or by the second crystal. This can refer, for example, to a division of an illuminating light bundle that contains light having multiple wavelengths. Provision can also be made, however, that the dispersive optical component also, in addition to a compensation for a division of illuminating light, compensates for a spatial spectral division of detected light.

The dispersive optical component can be disposed so that it undoes a spatial spectral division that has already occurred. The compensation can also be accomplished, however, in such a way that the dispersive optical component causes a spatial spectral division that is undone by the crystal or by the second crystal.

Very particularly advantageously, the acousto-optic beam combiner according to the present invention can be part of a light source for a microscope, in particular a scanning microscope or confocal scanning microscope. Such a light source can, in particular, comprise multiple primary light sources whose illuminating light bundles are combined by the acousto-optic beam combiner.

It is also possible for at least one of the primary light sources to generate unpolarized primary light, in particular white light. A light source of this kind can comprise, for example, a polarizing beam splitter that receives the unpolarized primary light and divides it spatially, as a function of the linear polarization direction, so that the resulting illuminating light beam bundles can be exposed, via different inputs of a crystal or of multiple crystals, to the action of the mechanical wave or to the action of the mechanical waves.

Illuminating light having one or more wavelengths can thereby be selected and collinearly directed, in a very targeted and extremely flexibly switchable fashion, into an illumination beam path in order to illuminate a sample, with no loss, for example, of the light intensity of the unpolarized primary light (aside from the usual losses upon incoupling and outcoupling into and from optical components). In particular, it is not necessary in principle to dispense entirely with light of one linear polarization direction.

Very particularly advantageously, the acousto-optic beam combiner according to the present invention can be part of a microscope, in particular of a scanning microscope or a confocal scanning microscope. Such a microscope is very advantageously usable especially in microscopy techniques in which a sample is to be impinged upon simultaneously or successively with illuminating light having different properties, as in the case of illumination of a sample in stimulated emission depletion (STED) microscopy or in coherent anti-Stokes Raman spectroscopy (CARS) microscopy or in stimulated Raman scattering (SRS) microscopy or in coherent Stokes Raman scattering (CSRS) microscopy or in Raman-induced Kerr effect scattering (RIKES) microscopy, since the illumination parameters are adjustable quickly and flexibly, including in terms of the polarization of the illuminating light, and there is no need to accept large losses of primary light power level due to beam combination that is to be performed.

Such a microscope is, however, also advantageous in the field of normal fluorescence microscopy. Provision can in particular advantageously be made here that the acousto-optic beam combiner receives detected light emerging from a sample and removes from that detected light those portions which have the illuminating light wavelength and/or the further illuminating light wavelength and/or the other illuminating light wavelength.

This is because in fluorescence microscopy the portions of illuminating light reflected at the sample and scattered at the sample must be removed from the detected light so that exclusively the fluorescent light can be detected. In a conventional microscope a dichroic filter, constituting a so-called "main beam splitter," is used for this purpose.

In a particular embodiment, both a portion of the detected light bundle having the illuminating light wavelength and a first linear polarization direction, and a portion of the detected light having the illuminating light wavelength and a second linear polarization direction perpendicular to the first linear polarization direction, are deflected out of a detected light bundle coming from a sample by interaction with the mechanical wave of the crystal, and are thereby removed from the detected light bundle. Alternatively or additionally, provision can also be made that both a portion of the detected light bundle having the further illuminating light wavelength and a first linear polarization direction, and a portion of the detected light having the further illuminating light wavelength and a second linear polarization direction perpendicular to the first linear polarization direction, are deflected out of a detected light bundle coming from a sample by interaction with the mechanical wave of the second crystal, and are thereby removed from the detected light bundle.

Alternatively or additionally, it is also possible for the crystal and the propagation direction of the mechanical wave to be oriented, relative to one another and respectively relative to the detected light bundle incident into the crystal, in such a way that the acousto-optic beam combiner deflects, with the mechanical wave, both the portion of the detected light bundle having the illuminating wavelength and a first linear polarization direction, and the portion of the detected light bundle having the illuminating wavelength and a second linear polarization direction perpendicular to the first polarization direction, and thereby removes them from the detected light bundle; and/or for the second crystal and the propagation direction of the second mechanical wave to be oriented, relative to one another and respectively relative to the detected light bundle incident into the second crystal, in such a way that the acousto-optic beam combiner deflects, with the second mechanical wave, both the portion of the detected light bundle having the further illuminating wavelength and a first linear polarization direction, and the of the detected light bundle having the further illuminating wavelength and a second linear polarization direction perpendicular to the first polarization direction, and thereby removes them from the detected light bundle.

As already mentioned analogously with reference to a successive arrangement of the crystals, provision can advantageously be made that the detected light bundle passes firstly through the crystal and then through the second crystal.

Irrespective of the specific embodiment of the acousto-optic beam combiner, but in particular in the context of an acousto-optic beam combiner in which a mechanical wave acts on the light portions having one illuminating light wavelength and both linear polarization directions, provision can advantageously be made that the beam-guiding components of the beam combiner are arranged and embodied in such a way that the remaining part of the detected light bundle leaves the acousto-optic beam combiner collinearly. The detected light bundle can in that fashion be conveyed in simple fashion to a detector, for example to a multi-band detector.

As already indicated repeatedly, the acousto-optic beam combiner according to the present invention, or the light source equipped with such a beam combiner, can be used for illumination of a sample or for illumination of a sample in stimulated emission depletion (STED) microscopy or in coherent anti-Stokes Raman spectroscopy (CARS) microscopy or in stimulated Raman scattering (SRS) microscopy or in coherent Stokes Raman scattering (CSRS) microscopy or in Raman-induced Kerr effect scattering (RIKES) microscopy.

The subject matter of the invention is schematically depicted in the drawings and will be described below with reference to the Figures, identically functioning elements being labeled with the same reference characters. In the drawings:

FIG. 1 schematically shows an exemplifying embodiment of a microscope according to the present invention having a beam combiner according to the present invention and a further acousto-optic beam combiner that functions as a main beam splitter;

Figure 1:
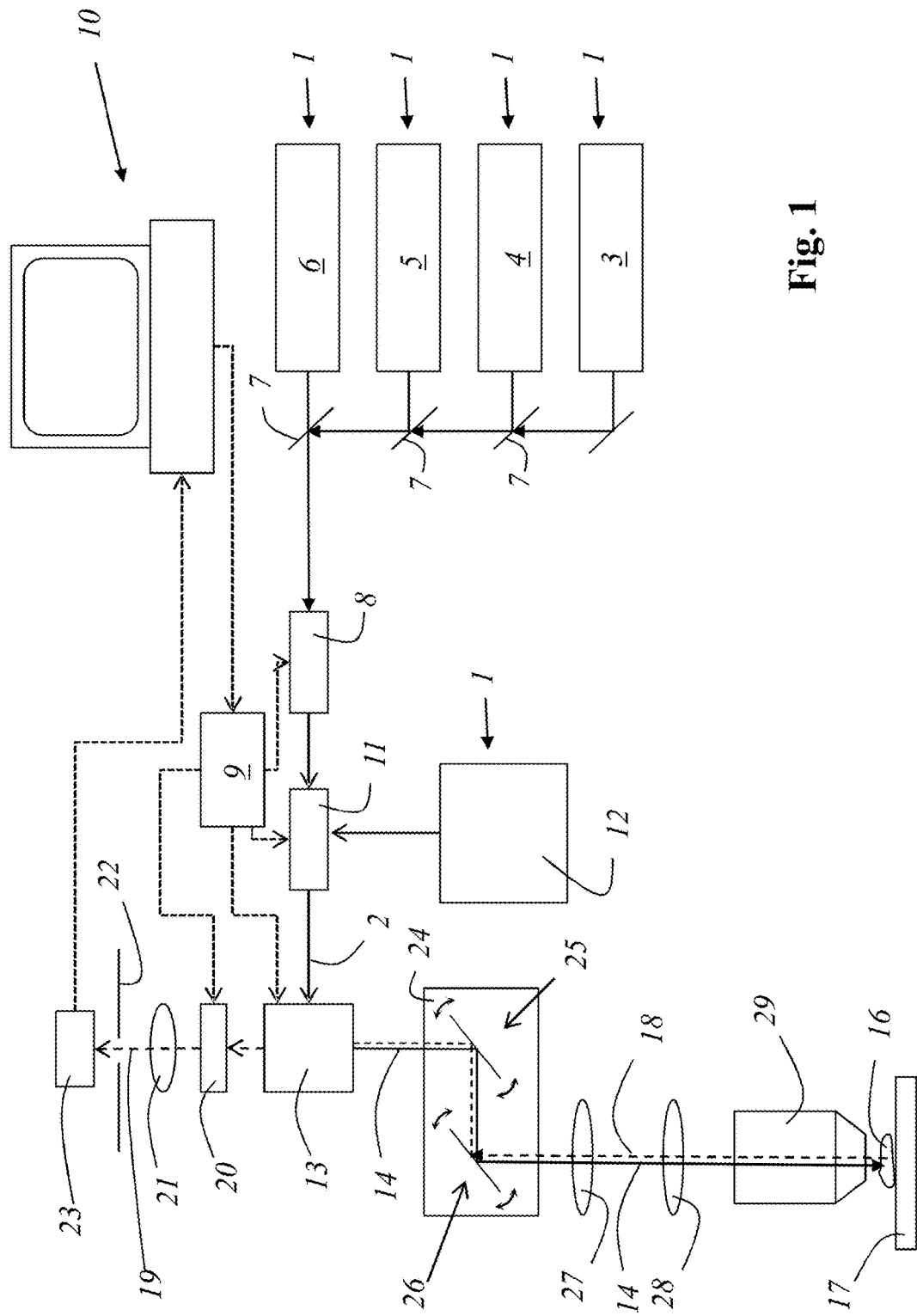
Figure 6:
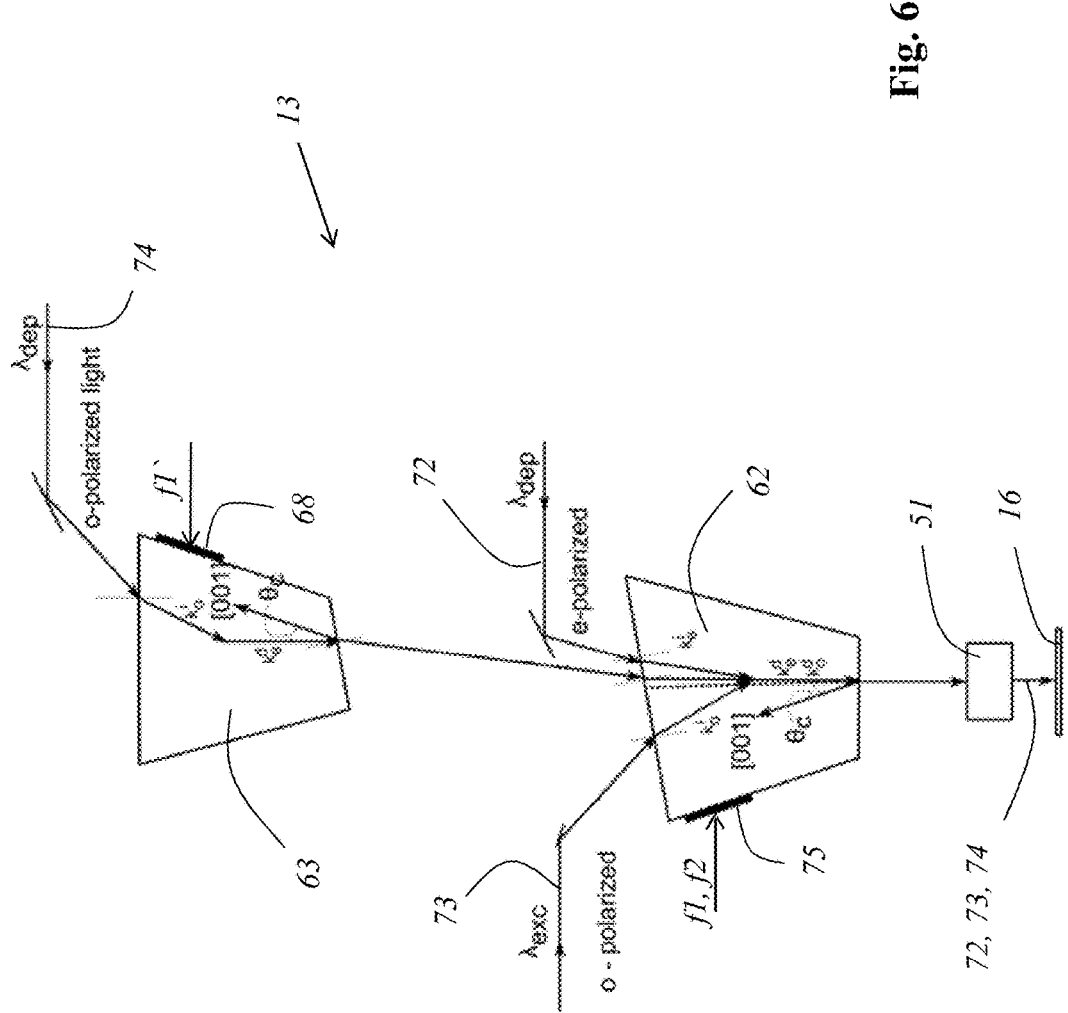
Figure 7:
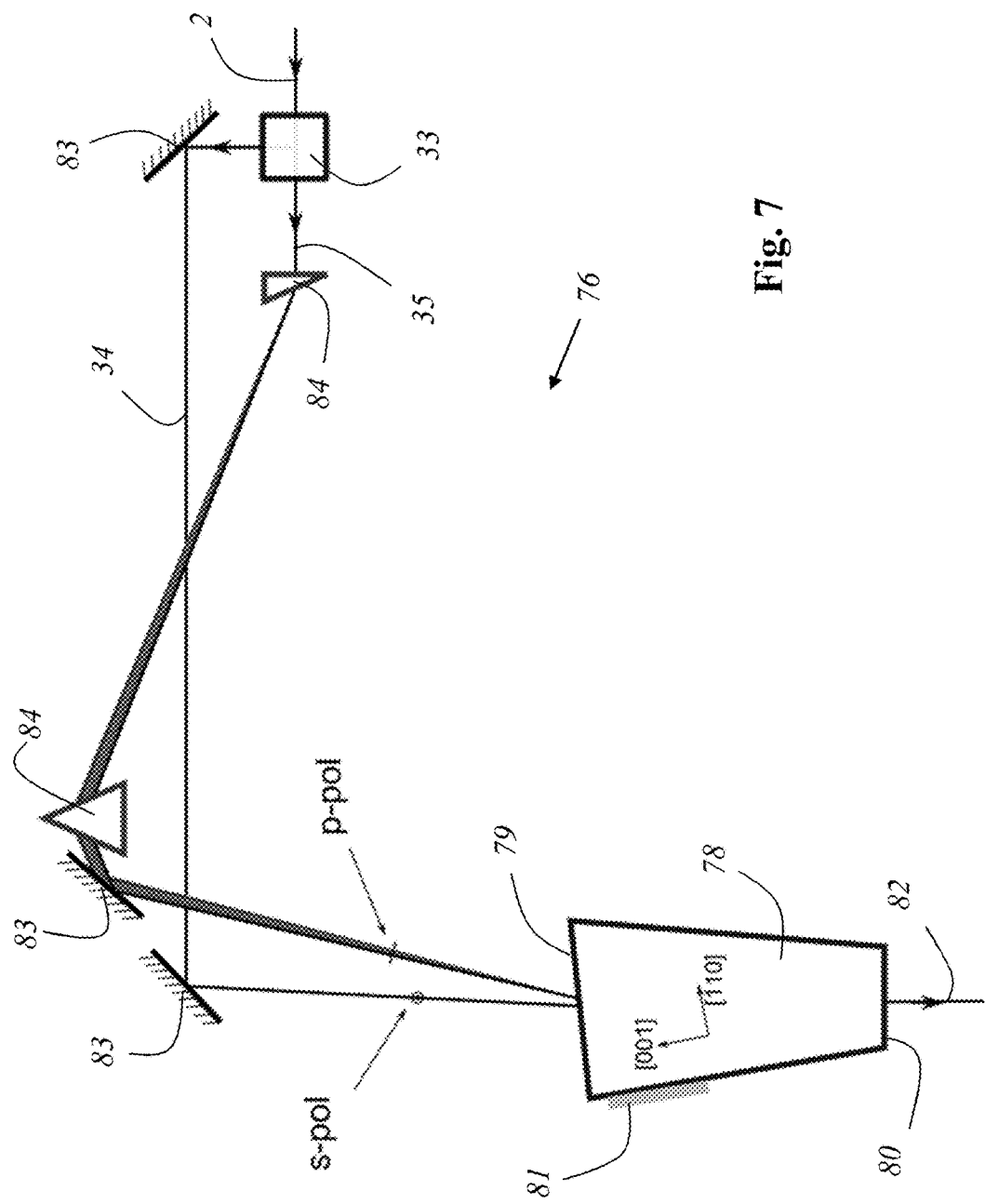

FIG. 6 shows the third exemplifying embodiment with reference to a special utilization capability in STED microscopy; and FIG. 7 shows a fourth exemplifying embodiment of an acousto-optic beam combiner according to the present invention FIG. 1 shows a microscope, embodied as a confocal scanning microscope, that is equipped with an acousto-optic beam combiner 11 according to the present invention and with a further acousto-optic beam combiner 13 according to the present invention that functions as a main beam splitter.

The microscope contains multiple light sources 1 whose light is combined into one collinear illuminating light bundle 2. Specifically, the microscope contains a diode laser 3, a (preferably diode-pumped) solid state laser 4 (DPSS laser), a helium-neon laser 5, and an argon ion laser 6, whose emitted light bundles are combined with the aid of dichroic beam splitters 7. The combined emitted light bundles then travel to an acousto-optic tunable filter (AOTF) 8 that allows light having specific wavelengths to be selected from the combined emitted light bundle and passed on. AOTF 8 is impinged upon for this purpose by electromagnetic high-frequency waves of a high-frequency source 9; the user can define, by input via a PC 10, which wavelength or wavelengths the passed-on light is to have, and the frequency of high-frequency source 9 is automatically adjusted accordingly by the microscope. Mechanical waves for diffracting the desired light are generated inside AOTF 8 with the aid of the electromagnetic high-frequency waves.

The microscope furthermore has an acousto-optic beam combiner 11 that receives on the one hand light passed on from AOTF 8, and on the other hand the light of a white light source 12.

A white light source 12 of this kind can comprise in particular a special optical element, for example a microstructured optical element and/or a tapered fiber and/or a photonic crystal fiber and/or a photonic crystal and/or a photonic band gap material and/or a comparable optical element inducing nonlinearities, which spectrally broadens the incident primary light, in particular the light of a pulsed laser. A light source of this kind can make available primary light having a spectral width of several 10s of nm, in particular several 100s of nm.

Acousto-optic beam combiner 11 is likewise impinged upon by electromagnetic high-frequency waves that are furnished by high-frequency source 9. Acousto-optic beam combiner 11 contains an acousto-optic element in which mechanical waves for deflecting or diffracting light bundles can be generated, with the electromagnetic high-frequency waves, in such a way that the respectively desired portions of the light passed on from AOTF 8 and the respectively desired portions of the light of white light source 12 leave acousto-optic beam combiner 11 collinearly with one another as a combined illuminating light bundle. Acousto-optic beam combiner 11 is constructed and operated in such a way that by interaction with at least one mechanical wave, both the light passed on from AOTF 8 and the light of white light source 12 are diffracted and are thereby directed into a common optical axis.

The microscope furthermore contains a further acousto-optic beam combiner 13 that functions as a main beam splitter and has the task of directing illuminating light 14 having a desired wavelength, or illuminating light 14 having multiple desired wavelengths, into an illuminating light beam path 15, and on the other hand the task of removing, from the polychromatic and collinear detected light bundle 18 (shown with dashed lines) emerging from the illuminated sample 16 that is arranged on a specimen stage 17, the portions of illuminating light 15 scattered and/or reflected at sample 16.

Illuminating light 14 directed from further acousto-optic beam combiner 13 into illumination beam path 15 travels to a beam deflection device 24 that contains a first galvanometer mirror 25 and a second galvanometer mirror 26. The remaining part of primary light 2 is not influenced by the mechanical wave or waves, and travels into beam traps (not depicted).

After leaving beam deflection device 24, illuminating light 14 travels to scanning lens 27, then to tube lens 28 and lastly to an objective 29 that focuses illuminating light 14 onto or into sample 16.

Beam deflection device 24 guides the focus of illuminating light 14 preferably in a meander shape over or through sample 16. Galvanometer mirror 25 is responsible for deflection in an X direction, while second galvanometer mirror 26 is responsible for deflection in a Y direction.

Further acousto-optic beam combiner 13 is also impinged upon by at least one electromagnetic high-frequency wave in order to generate at least one mechanical wave having one frequency. The frequency of the mechanical wave can be modified by modifying the frequency of the electromagnetic high-frequency wave. The mechanical wave can be generated, for example, with the aid of a piezo acoustic generator.

A crystal (not depicted in this Figure) of further acousto-optic beam combiner 13 in which the mechanical wave propagates, and the propagation direction of the mechanical wave, are oriented with respect to detected light bundle 18 coming from sample 16 in such a way that acousto-optic beam combiner 13 deflects, with the mechanical wave, both the portion of detected light bundle 18 having the illuminating wavelength and a first linear polarization direction, and the portion of detected light bundle 18 having the illuminating wavelength and a second linear polarization direction perpendicular to the first polarization direction, and thereby removes them from detected light bundle 18. Remaining portion 19 of detected light bundle 18 leaves the crystal collinearly and, after passing through an acousto-optic notch filter (AONF) 20, an imaging optical system 21, and a detection pinhole 22, arrives at a detector 23 that is preferably embodied as a multi-band detector. The electrical signals of detector 23 are transferred to PC 10 for further processing and evaluation.

The microscope is configured in such a way that not only can light having one wavelength be directed as illuminating light 14 into illuminating light beam path 15, and not only can light having one wavelength be removed from detected light bundle 18 coming from sample 16, but multiple mechanical waves can instead be used simultaneously to remove illuminating light having multiple different wavelengths (and both linear polarization directions) from the detected light and/or to direct illuminating light having multiple different wavelengths (and both linear polarization directions) into the illuminating light beam path, although advantageously only a single mechanical wave is generated for each illuminating light wavelength in the crystal of further acousto-optic beam combiner 13.

Further acousto-optic beam combiner 13 is impinged upon, for each illuminating light wavelength desired by the user, by a separate electromagnetic high-frequency wave that is generated by high-frequency source 9. For the sake of completeness, it should be mentioned that the different high-frequency waves that high-frequency source 9 furnishes for AONF 20, for acousto-optic beam combiner 11, for AOTF 8, and for further acousto-optic beam combiner 13 as a rule have different frequencies. It is also possible, however, to embody the acousto-optic components in such a way that two high-frequency waves having the same frequency can be used for at least of two acousto-optic components.

Figure 2:
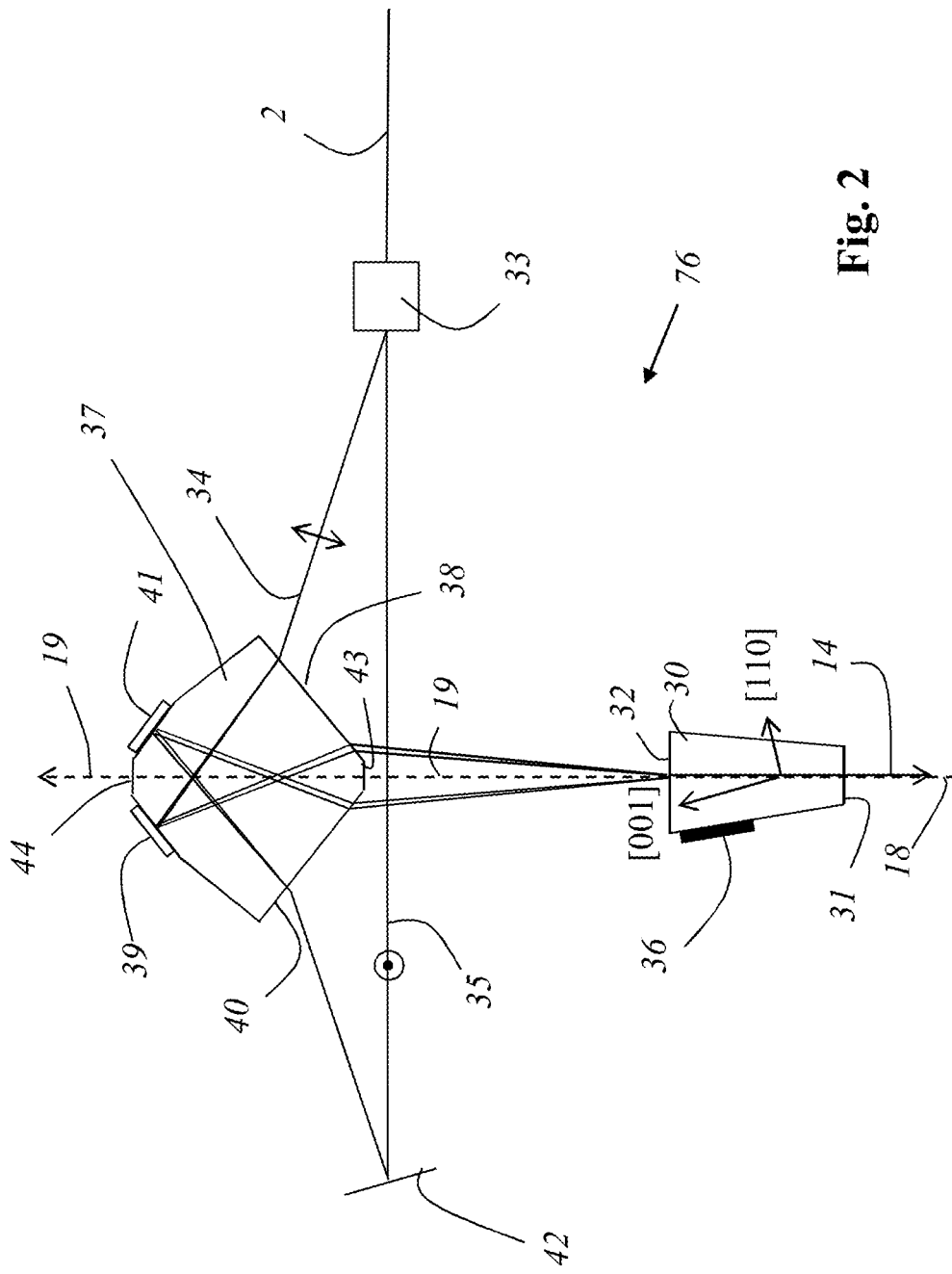
FIG. 2 shows an exemplifying embodiment of an acousto-optic beam combiner according to the present invention.

FIG. 2 schematically shows an exemplifying embodiment of an acousto-optic beam combiner 76.

Acousto-optic beam combiner 76 is preceded by a polarizing beam splitter 33 that receives unpolarized primary light having multiple wavelengths, in particular unpolarized broad-band primary light 2, for example of a white light source. Polarizing beam splitter 33 spatially divides primary light 2 into a first illuminating light bundle 34 and a second illuminating light bundle 35, the light of illuminating light bundles 34, 35 having mutually perpendicular linear polarization directions.

Acousto-optic beam combiner 76 contains a crystal 30 having an entrance surface 31 for detected light bundle 18 (drawn with dashed lines) coming from a sample (not detected here) and having an exit surface 32 for remaining portion 19 of detected light bundle 18, which is ultimately directed to a detector (not illustrated here). Exit surface 32 for remaining portion 19 is at the same time the entrance surface for coupling first illuminating light bundle 34 and second illuminating light bundle 35 into crystal 30.

Arranged on crystal 30 is a piezo acoustic generator 36 that is impinged upon by an electromagnetic high-frequency wave having one frequency or by multiple electromagnetic high-frequency waves having multiple frequencies, in order to respectively generate a mechanical wave or multiple different mechanical waves. With the aid of the mechanical wave or multiple mechanical waves, the light portions having a desired illuminating light wavelength or the light portions having multiple desired illuminating light wavelengths can be respectively deflected by diffraction both out of first illuminating light bundle 34 and out of second illuminating light bundle 35, and thus directed collinearly into an illumination beam path 15, one of the illuminating light wavelengths being respectively associated (simultaneously for both linear polarization directions) with one frequency of the respective mechanical wave (in particular in order to satisfy the respective Bragg condition).

Illuminating light 14 leaves crystal 30 through entrance surface 31 for detected light bundle 18, which is thus simultaneously the exit surface for illuminating light 14.

At the same time, that light portion which has the wavelength or wavelengths of illuminating light 14 is removed from detected light bundle 18 (drawn with dashed lines) with the aid of the mechanical wave or waves, crystal 30 and the propagation direction of the mechanical wave(s) being oriented, with respect to detected light bundle 18 coming from sample 16, in such a way that each of the mechanical waves deflects both the portion of detected light bundle 18 having the illuminating wavelength and a first linear polarization direction, and the portion of detected light bundle 18 having the illuminating wavelength and a second linear polarization direction perpendicular to the first polarization direction, and thereby removes them from detected light bundle 18. Remaining portion 19 of detected light bundle 18 leaves the crystal collinearly through exit surface 32. In the Figure, the orientation of the crystal structure is schematically indicated by labeling with the crystal axes [001] and [110].

First illuminating light bundle 34 is coupled into crystal 30 oppositely to the direction of the first diffraction order of the ordinary light (with respect to the diffracted portion of the detected light), while second illuminating light bundle 35 is coupled into crystal 30 oppositely to the direction of the first diffraction order of the extraordinary light (with respect to the diffracted portion of the detected light). All of the primary light 2 is thus available so that from that primary light 2, illuminating light 14 having a specific wavelength or specific wavelengths can be directed with the aid of the acousto-optic apparatus into the illuminating light beam path of the microscope and thus to the sample, only a single mechanical wave having a single frequency being necessary for each wavelength.

In order to achieve collinearity of illuminating light bundle 14 emerging from crystal 30, crystal 30 is preceded by a dispersive optical component 37 that spatially spectrally divides first illuminating light bundle 34 and second illuminating light bundle 35, the degree of spatial division being defined (in particular by selection of the angles and/or of the optical path lengths) so that it is undone again by crystal 30.

Dispersive optical component 37 comprises an incoupling and outcoupling window 38 for first illuminating light bundle 34. First illuminating light bundle 34 firstly enters dispersive optical component 37 through incoupling and outcoupling window 38, and after passing through dispersive optical component 37 is reflected by a first mirror 39 that is mounted on a surface located oppositely from incoupling and outcoupling window 38, before first illuminating light bundle 34, having been spatially and spectrally divided, leaves dispersive optical component 37 again through incoupling and outcoupling window 38.

Dispersive optical component 37 analogously comprises a further incoupling and outcoupling window 40 for second illuminating light bundle 35 deflected by a deflection mirror 42. Second illuminating light bundle 35 firstly enters dispersive optical component 37 through further incoupling and outcoupling window 40, and after passing through dispersive optical component 37 is reflected by a second mirror 41 that is mounted on a surface located oppositely from further incoupling and outcoupling window 40, before second illuminating light bundle 35, having been spatially and spectrally divided, leaves dispersive optical component 37 again through further incoupling and outcoupling window 40.

Dispersive optical component 37 furthermore comprises an incoupling surface 43 and an outcoupling surface 44, parallel thereto, for remaining portion 19 of detected light bundle 18. Remaining portion 19 of detected light bundle 18 passes orthogonally both through incoupling surface 43 and through the parallel outcoupling surface 44, and therefore experiences no spectral division.

Figure 3:
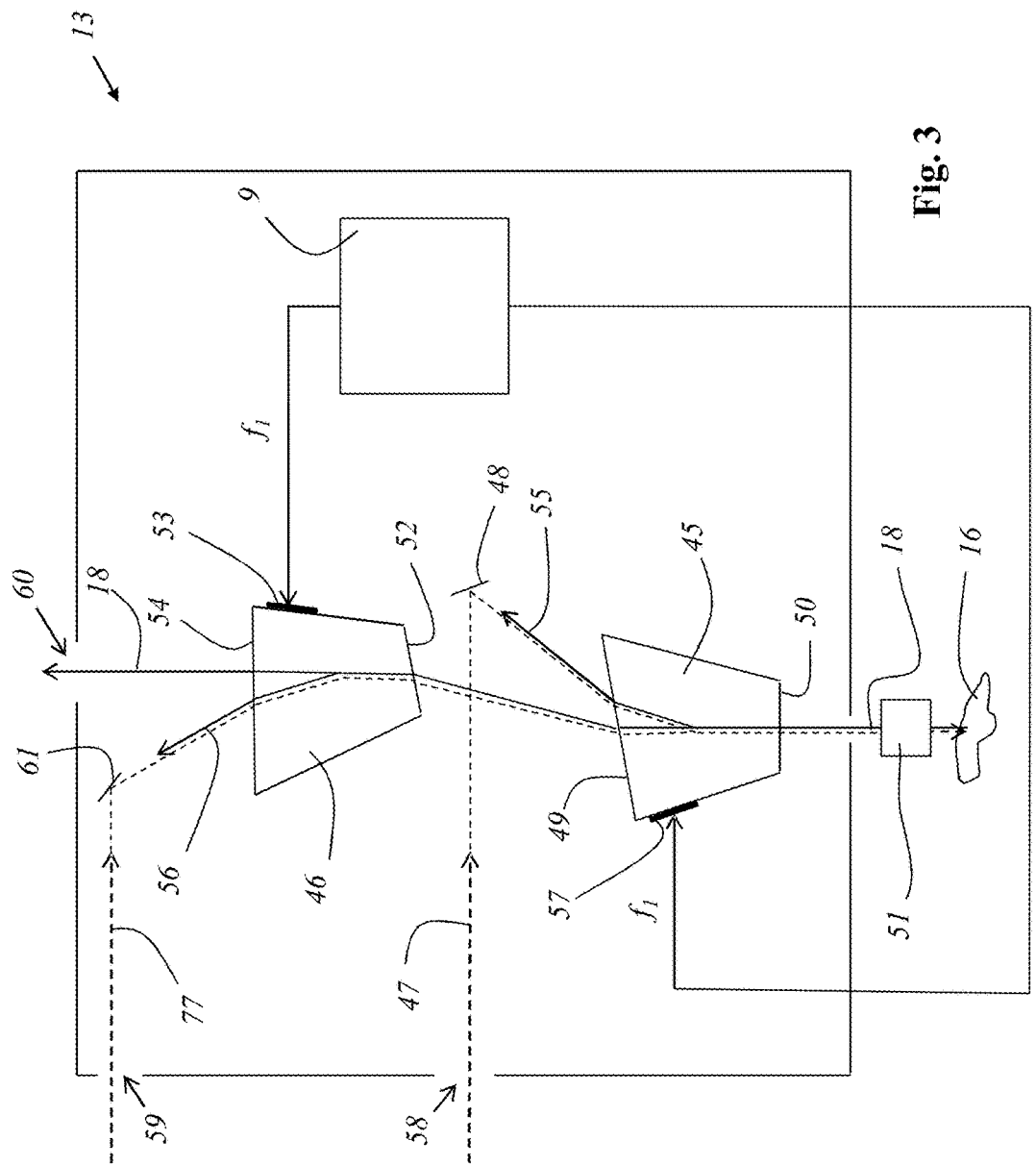
FIG. 3 shows a second exemplifying embodiment of an acousto-optic beam combiner according to the present invention.

FIG. 3 shows a second exemplifying embodiment of an acousto-optic beam combiner 13 according to the present invention, which comprises a first crystal 45 and a second crystal 46.

Acousto-optic beam combiner 13 that is depicted receives, through a first input 58, a first illuminating light bundle 47 of a light source (not depicted). First illuminating light bundle 47 is deflected with the aid of a mirror 48 toward first crystal 45, and enters the latter through an entrance surface 49.

Arranged on first crystal 45 is a first piezo acoustic generator 57 that is impinged upon by an electromagnetic high-frequency wave, having frequency f1, of a high-frequency source 9, and that generates a mechanical wave (not depicted) propagating through first crystal 45 and having an acoustic frequency corresponding to frequency f1.

By interaction with the mechanical wave, first illuminating light bundle 47, which has an illuminating light wavelength associated with the acoustic frequency, is deflected into an illumination beam path for illumination of a sample 16. The deflected illuminating light bundle 47 leaves first crystal 45 through an exit surface 50 and travels via a scanning and optical arrangement 51 of a microscope, which in particular contains at least a scanning device and a microscope objective, to sample 16 that is to be illuminated.

Acousto-optic beam combiner 13 comprises a second crystal 46. Arranged on second crystal 46 is a second piezo acoustic generator 53 that is likewise impinged upon by an electromagnetic high-frequency wave, having frequency f1, of high-frequency source 9, and that generates a second mechanical wave (not depicted) propagating through second crystal 46 and having an acoustic frequency corresponding to frequency f1.

The second crystal receives a second illuminating light bundle 77, entering through a second input 59 of beam combiner 13, that has the same wavelength but another linear polarization direction, namely one perpendicular to the linear polarization direction of first illuminating light bundle 47. Second illuminating light bundle 77 is deflected with the aid of a mirror 61 toward second crystal 46, and enters the latter through its entrance surface 54.

By interaction with the second mechanical wave that propagates in second crystal 46, second illuminating light bundle 77 is deflected and is directed into a beam path that proceeds through first crystal 45. Once second illuminating light bundle 77 has left second crystal 46 through its exit surface 52, it travels to first crystal 45. In first crystal 45, second illuminating light bundle 77 is not deflected by the first mechanical wave that propagates in first crystal 45. First illuminating light bundle 47 is diffracted in first crystal 45 into the light path of second illuminating light bundle 77. Illuminating light bundles 47, 77 leave first crystal 45 as a collinearly combined illuminating light bundle.

The situation such that with acoustic waves having the same acoustic frequency in both crystals 45, 46, on the one hand first illuminating light bundle 47 is deflected in first crystal 45 and on the other hand second illuminating light bundle 77 is deflected in second crystal 46, while first illuminating light bundle 47 passes through the first crystal uninfluenced by its mechanical wave, is achieved by the fact that crystals 45, 46 are different and are coordinated with one another, in terms of at least one parameter such as crystal cut and/or crystal orientation and/or propagation directions of the mechanical wave and of the light, in such a way that the Bragg condition is respectively satisfied for the respective illuminating light bundle 47, 77 that is to be deflected.

Detected light bundle 18 emerging from sample 16 travels, on a reverse light path from the collinearly combined illuminating light bundles 47, 77, back to first crystal 45 and enters the latter through exit surface 50. By interaction with the mechanical wave of first crystal 45, a first part 55 of the detected light, which has the illuminating light wavelength and a first linear polarization direction, is deflected and is thereby removed from detected light bundle 18. The remaining part of detected light bundle 18 exits from first crystal 45 through entrance surface 49 and then travels to exit surface 52 of second crystal 46.

By interaction with the second mechanical wave that propagates in second crystal 46, a second part 56 of the detected light, which has the illuminating light wavelength and a second linear polarization direction perpendicular to the first linear polarization direction, is deflected and is thereby removed from detected light bundle 18. The remaining part of detected light bundle 18 exits from second crystal 46 through entrance surface 54 and then travels to a detector (not depicted).

The situation such that with acoustic waves having the same acoustic frequency in both crystals 45, 46, both first part 55 of the detected light which has the illuminating light wavelength and a first linear polarization direction, and second part 56 of the detected light which has the illuminating light wavelength and a second linear polarization direction perpendicular to the first linear polarization direction, can be deflected sequentially, is achieved, as already described above with reference to illuminating light bundles 47, 77, by the fact that crystals 45, 46 are different and are coordinated with one another, in terms of at least one parameter such as crystal cut and/or crystal orientation and/or propagation directions of the mechanical wave and of the light, in such a way that the Bragg condition is respectively satisfied for the light that is to be deflected.

The crystals are embodied and arranged in such a way that the detected light to be delivered to the detector leaves acousto-optic beam combiner 13 through an output 60 as a collinear light bundle. This is achieved in particular by the fact that entrance surface 54 and exit surface 50 are oriented parallel to one another.

Figure 4:
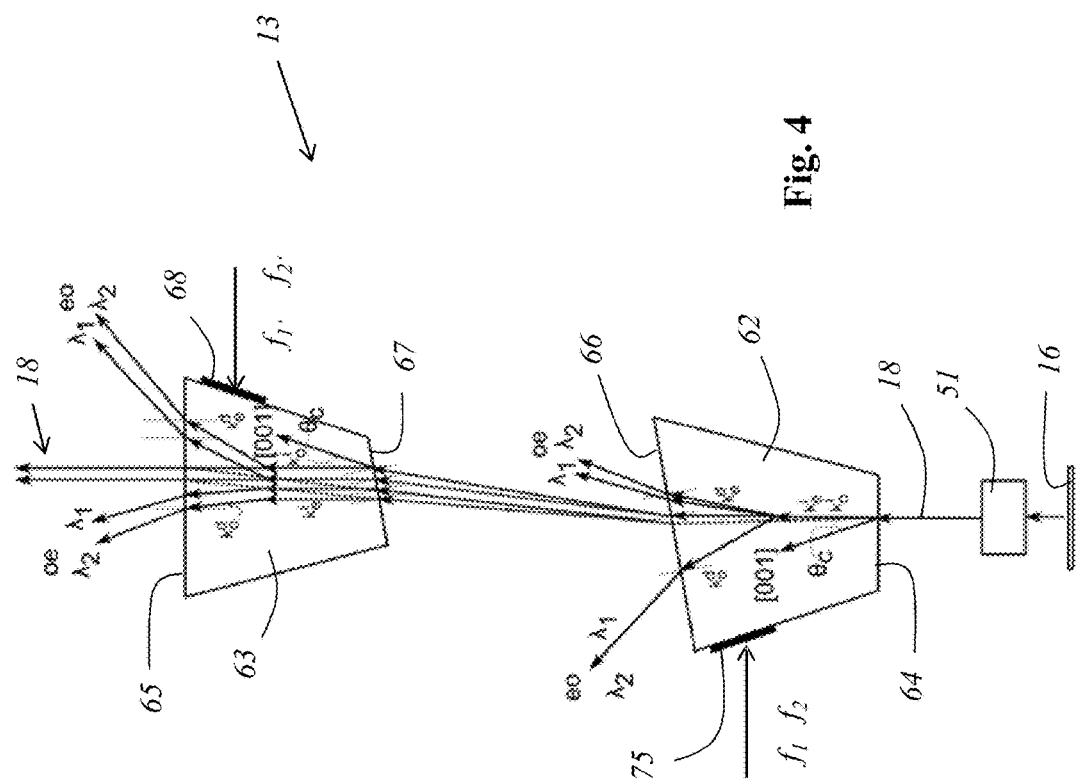
FIG. 4 shows a third exemplifying embodiment of an acousto-optic beam combiner according to the present invention, with reference to processing of the detected light.
Figure 5:
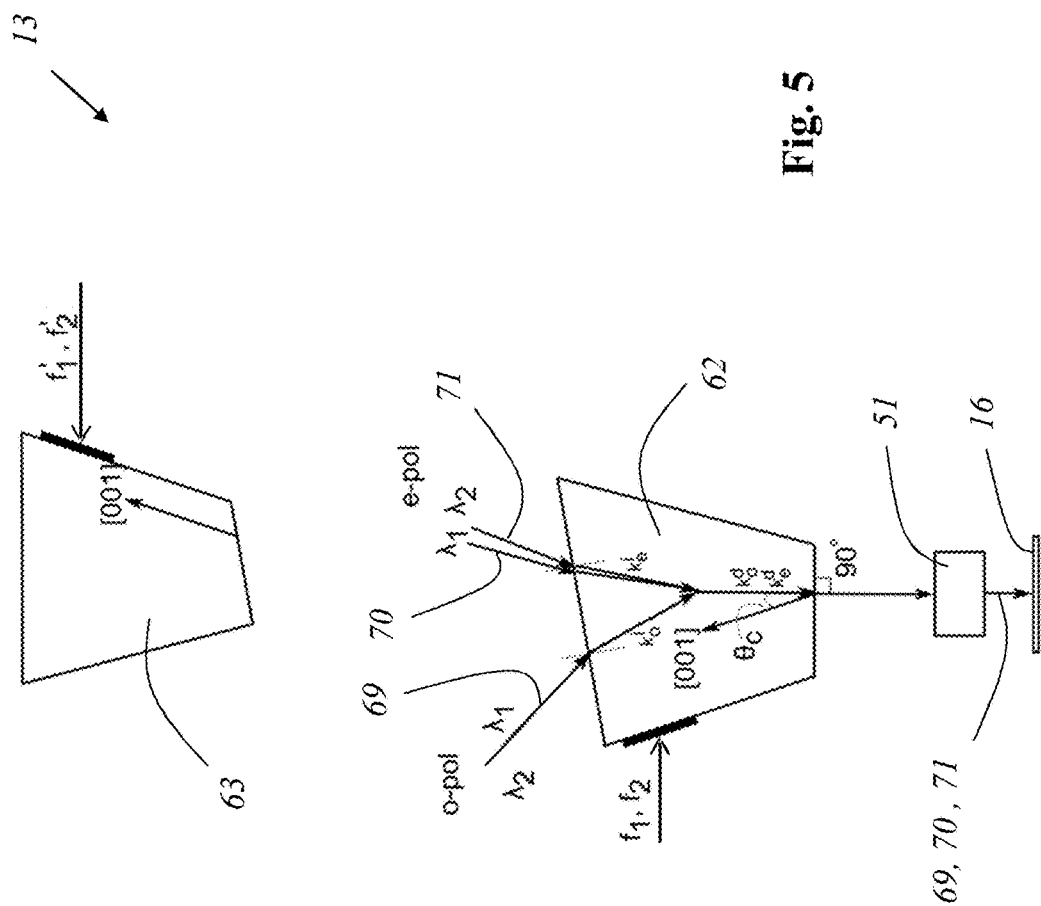
FIG. 5 shows the third exemplifying embodiment with reference to direction of the illuminating light.

FIG. 4 shows a third exemplifying embodiment of an acousto-optic beam combiner 13 according to the present invention that functions as a main beam splitter of a microscope, although for better clarity this Figure depicts only the progress of the detected light coming from sample 16 and the removal, from the detected light coming from sample 16, of the portions that have the illuminating light wavelengths $\lambda 1$ and $\lambda 2$. The progress of the illuminating light is depicted in FIG. 5.

Acousto-optic beam combiner 13 comprises a first crystal 62 on which is arranged a first piezo acoustic generator 75 that is impinged upon by two electromagnetic high-frequency waves having frequencies f1 and f2 and that generates two mechanical waves (not depicted) propagating through first crystal 62, each having an acoustic frequency corresponding to frequencies f1 and f2.

First crystal 62 in terms of its crystal structure, and the propagation directions of the mechanical waves, are oriented relative to one another, and respectively relative to detected light bundle 18 incident into the crystal, in such a way that with the mechanical wave both the portion of detected light bundle 18 having the illuminating wavelengths $\lambda 1$ and $\lambda 2$ and a first linear polarization direction, and the portion of the detected light bundle having the illuminating wavelengths $\lambda 1$ and $\lambda 2$ and a second linear polarization direction perpendicular to the first linear polarization direction, are deflected and are thereby removed from detected light bundle 18.

The removed portions are labeled oe and eo in the Figure. In this exemplifying embodiment the first linear polarization direction is the linear polarization direction of the ordinary light with respect to a birefringence property of crystal 62, while in this exemplifying embodiment the second linear polarization direction is the linear polarization direction of the extraordinary light with respect to a birefringence property of crystal 62. The designations "oe" and "eo" are intended to express the fact that the linear polarization direction of the incident detected light is respectively rotated 90° (from ordinary to extraordinary or vice versa) by interaction with the mechanical waves.

Acousto-optic beam combiner 13 furthermore comprises a second crystal 63 that receives the remaining detected light emerging from first crystal 62. This detected light is spatially divided both in terms of its polarization and in terms of its wavelength. Second crystal 63 is configured, however, in such a way that detected light bundle 18 emerging from it, which is conveyed to a detector (not depicted), is collinearly combined. This is achieved by the fact that exit window 64 of first crystal 62 is arranged parallel to entrance window 65 of second crystal 63, and that additionally entrance window 66 of first crystal 62 is arranged parallel to exit window 67 of second crystal 63. It should be noted once again for clarification that the terms "entrance surface" and "exit surface" refer to the progress of the illuminating light, so that the detected light, proceeding in a reverse direction from the illuminating light, exits through an entrance surface and enters through an exit surface.

Second crystal 63 serves on the one hand to remove portions having illuminating light wavelengths $\lambda 1$ and $\lambda 2$ that possibly still remain in the detected light despite interaction with the mechanical waves of first crystal 62. Second crystal 63 can furthermore serve to furnish a further input for illuminating light to be directed onto the sample (this is not depicted in detail here).

Arranged on second crystal 63 is a second piezo acoustic generator 68 that is impinged upon by two electromagnetic high-frequency waves having frequencies f1' and f2' and that generates two mechanical waves (not depicted) propagating through second crystal 63, each having an acoustic frequency corresponding to frequencies f1' and f2'.

Second crystal 63 in terms of its crystal structure, and the propagation directions of the mechanical waves, are oriented relative to one another, and respectively relative to detected light bundle 18 incident into the crystal, in such a way that with the mechanical wave both the portion of detected light bundle 18 having the illuminating wavelengths $\lambda 1$ and $\lambda 2$ and a first linear polarization direction, and the portion of the detected light bundle having the illuminating wavelengths $\lambda 1$ and $\lambda 2$ and a second linear polarization direction perpendicular to the first linear polarization direction, are deflected and are thereby removed from detected light bundle 18.

FIG. 5 shows how illuminating light having the illuminating light wavelengths $\lambda 1$ and $\lambda 2$, which has both a first linear polarization direction and a second linear polarization direction different from the first linear polarization direction, is collinearly directed, with acousto-optic beam combiner 13 already described in detail with reference to FIG. 3, into an illumination beam path for illumination of a sample 16.

In the description that follows, the illuminating light is depicted exclusively via first crystal 62 and through interaction with the mechanical waves (not depicted) propagating in that crystal 62. It is also alternatively or additionally possible, however, to couple in illuminating light via second crystal 63 and to direct it into the illumination beam path for illumination of a sample 16.

The illuminating light bundles are coupled in on a light path on which those portions of the detected light which have the illuminating light wavelengths are removed from detected light bundle 18, as depicted in FIG. 6.

Because of the particular crystal cut of first crystal 62, a first illuminating light bundle 69, which has a first linear polarization direction (labeled "o-pol" in the Figure) and portions having both illuminating light wavelengths $\lambda 1$ and $\lambda 2$, is coupled in as a collinear illuminating light bundle. By interaction with the mechanical waves, the light is directed into an illumination beam path for illumination of a sample 16. It travels via a scanning and optical arrangement 51 of a microscope, which in particular contains at least a scanning device and a microscope objective, to sample 16 that is to be illuminated.

A second illuminating light bundle 70 that has light having the illuminating light wavelength $\lambda 1$ and the second linear polarization direction, as well as a third illuminating light bundle 71 that has light having the illuminating light wavelength $\lambda 2$ and likewise the second linear polarization direction, are also coupled in as spatially separate illuminating light bundles 70, 71. The light of these illuminating light bundles 70, 71 also travels, by interaction with the mechanical waves that propagate in first crystal 62, into the illumination beam path and, via scanning and optical arrangement 51 of a microscope, to sample 16.

Light that does not have the illuminating light wavelength $\lambda 1$ or the illuminating light wavelength $\lambda 2$ is directed not into the illumination beam path but into a beam trap (not depicted).

FIG. 6 shows the third exemplifying embodiment with reference to a special utilization capability in STED microscopy; only the progress of the illuminating light that impinges upon the sample is depicted, but not, for better clarity, the progress of the detected light.

The resolution capability of a confocal scanning microscope is determined, among other factors, by the intensity distribution and physical extent of the focus of the excitation light bundle in the sample. An arrangement for increasing the resolution capability for fluorescence applications is known from WO 95/21393 A1. Here the lateral edge regions of the focus volume of the excitation light bundle are illuminated with the (optionally, specially shaped) focus of a further light bundle having another wavelength (called the "deexcitation" light bundle), so that the sample regions, excited by the excitation light bundle, are brought therein back into the ground state in stimulated fashion. Only the spontaneously emitted light from the regions not illuminated by the deexcitation light bundle is then detected, so that an overall improvement in resolution is achieved. The term "stimulated emission depletion" (STED) has become established for this method.

In the exemplifying embodiment depicted in FIG. 6, acousto-optic beam splitter 13 is used to direct both deexcitation light bundles 72, 74, coming from different directions, each having the wavelength $\lambda_{dep}$ and a different linear polarization, and excitation light having the wavelength $\lambda_{exc}$, into an illumination beam path for illumination of a sample 16.

Piezo acoustic generator 75 of first crystal 62 is impinged upon by a high-frequency wave having frequency f1 and by a high-frequency wave having frequency f2, and generates two mechanical waves (not depicted) propagating through first crystal 62, each having an acoustic frequency corresponding to one of frequencies f1 and f2.

Excitation light bundle 73 having the wavelength $\lambda_{exc}$ is coupled in via first crystal 62. By interaction with the mechanical wave that is generated by impingement of the high-frequency wave having frequency f2 on piezo acoustic generator 75, excitation light bundle 73 is diffracted and is directed into an illumination beam path for illumination of a sample 16. In coupling via first crystal 62 is particularly advantageous because the excitation light reflected at sample 16 can be filtered out of the detected light both in first crystal 62 with the mechanical wave having frequency f2 propagating therein, and with a mechanical wave propagating in second crystal 63.

First deexcitation light bundle 72, having an extraordinary linear polarization direction, is likewise coupled in via first crystal 62 and, by interaction with the mechanical wave generated by impingement of the high-frequency wave, having frequency f1, on piezo acoustic generator 75, is diffracted and directed into the illumination beam path for illumination of sample 16. First deexcitation light bundle 72 and excitation light bundle 73 consequently leave crystal 62 in collinearly combined fashion.

Piezo acoustic generator 68 of second crystal 63 is impinged upon by a high-frequency wave having frequency f1' and generates a mechanical wave (not depicted) of an acoustic frequency corresponding to frequency f1', propagating through second crystal 63. By interaction with this mechanical wave, second deexcitation light bundle 74 having the wavelength $\lambda_{dep}$, which has an ordinary linear polarization direction with respect to the birefringence property of second crystal 63, is diffracted and then proceeds, undeflected by the mechanical waves propagating therein, through first crystal 62 into the illumination beam path and lastly arrives at sample 16. Second deexcitation light bundle 74 experiences no deflection as a result of the mechanical waves propagating in the first crystal, since the Bragg condition is not satisfied. Second deexcitation light bundle 74, first deexcitation light bundle 72, and excitation light bundle 73 consequently leave crystal 62 in collinearly combined fashion and, after passing through a scanning and optical arrangement 51 of a microscope, which in particular contains at least a scanning device and a microscope objective, encounter sample 16 that is to be illuminated.

An element (not depicted) for modifying the shape of the illuminating light focus of deexcitation light bundle 72 can be provided, for example, in the beam path of first deexcitation light bundle 72. This element can comprise, for example, a phase filter or a progressive phase filter or a segmented phase filter or a switchable phase matrix, in particular an LCD matrix. Provision can be made in particular that what is generated with the aid of the element for modifying the shape of the illuminating light focus is an annular focus ("donut focus") in sample 16, which overlaps with the focus of excitation light bundle 73 in the X-Y plane, i.e. in a plane perpendicular to the optical axis, in order to bring about an increase in resolution in an X-Y direction. An annular focus can be achieved, for example, with a so-called vortex phase filter.

A further element (not depicted) for modifying the shape of the illuminating light focus of deexcitation light bundle 72 can also be arranged in the beam path of second deexcitation light bundle 74. Provision can be made in particular that with the aid of the further element for modifying the shape of the illuminating light focus, a double focus is generated which overlaps with the focus of excitation light bundle 73 in a Z direction, preferably above and below the center of the focus of deexcitation light bundle 73, in order to bring about increased resolution in a Z direction.

The beam combiner shown in FIG. 6 has been described with reference to the specific use in STED microscopy. It is also possible, however, also to use the beam combiner in the manner described in order to combine illuminating light bundles for other applications.

The acousto-optic beam combiner depicted in FIG. 6 is in this regard a specific embodiment of a more general approach to achieving the stated object, in which the acousto-optic beam combiner comprises a first crystal through which a first mechanical wave propagates, and comprises a second crystal through which a second mechanical wave propagates, the first illuminating light bundle being diffracted by interaction with the first mechanical wave and being directed into the common optical axis, and the second illuminating light bundle being diffracted by interaction with the second mechanical wave and being directed into the common optical axis, and the diffracted second illuminating light bundle passing through the first crystal without interaction with the first mechanical wave and emerging from the first crystal collinearly, i.e. on a common optical axis, with the first illuminating light bundle.

In this exemplifying embodiment as well, those portions of the detected light which have the wavelength of the illuminating light are removed, irrespective of their polarization, from the detected light bundle emerging from the sample.

As previously described in detail, however, in this exemplifying embodiment as well those portions which have the wavelength $\lambda_{exc}$ of the excitation light are removed from the detected light bundle coming from the sample.

FIG. 7 shows a fourth exemplifying embodiment of an acousto-optic beam combiner 76 according to the present invention.

Acousto-optic beam combiner 76 is preceded by a polarizing beam splitter 33 that receives unpolarized primary light having multiple wavelengths, in particular unpolarized broad-band primary light 2, for example of a white light source. Polarizing beam splitter 33 spatially divides primary light 2 into a first illuminating light bundle 34 and a second illuminating light bundle 35, the light of illuminating light bundles 34, 35 having mutually perpendicular linear polarization directions.

Acousto-optic beam combiner 76 contains a crystal 78 having an entrance surface 79 for the two illuminating light bundles 34, 35 and an exit surface 80 through which the combined collinear illuminating light bundle leaves crystal 78. Arranged on crystal 78 is a piezo acoustic generator 81 that is impinged upon by an electromagnetic high-frequency wave having one frequency or by multiple electromagnetic high-frequency waves having multiple frequencies, in order to generate respectively a mechanical wave or multiple different mechanical waves. With the aid of the mechanical wave or with the aid of the multiple mechanical waves, the light portions having a desired illuminating light wavelength or the light portions having multiple desired illuminating light wavelengths can respectively be deflected both out of first illuminating light bundle 34 and out of second illuminating light bundle 35, and can thus be deflected as a collinearly combined illuminating light bundle 82 into a common illumination beam path, one respective frequency of the respective mechanical wave (in particular in order to respectively satisfy the Bragg condition) being associated with one of the illuminating light wavelengths, simultaneously for both linear polarization directions.

A particular feature of acousto-optic beam combiner 76 is that, especially because of the particular construction and particular alignment of crystal 78, it would spatially spectrally divided only second illuminating light bundle 35, while the portion of first illuminating light bundle 34 deflected into the illumination beam path experiences no spatial division. No compensation elements, for example prisms, are therefore required in the beam path of first illuminating light bundle 34. The beam path of first illuminating light bundle 34 therefore merely contains some deflecting mirrors 83 in order to direct first illuminating light bundle 34 from polarizing beam splitter 33 to crystal 78. It is only in the beam path of second illuminating light bundle 35 that, besides a deflecting mirror 83, two prisms 84 are arranged which spatially spectrally divide second illuminating light bundle 35 in such a way that the division is undone again upon passage through crystal 78.

The invention has been described with reference to a particular embodiment, the same reference characters usually being used for identical or identically functioning components. It is self-evident, however, that modifications and variations can be carried out without thereby departing from the range of protection of the claims hereinafter.

The invention claimed is:

1. A beam combiner for a microscope or a scanning microscope, which receives at least a first illuminating light bundle and a second illuminating light bundle and combines them into a collinear output light bundle, the first illuminating light bundle and the second illuminating light bundle having the same illuminating light wavelength but a different linear polarization,
- wherein the beam combiner is embodied as an acousto-optic beam combiner and is constructed and operated in such a way that by interaction with at least one mechanical wave, both the first illuminating light bundle and the second illuminating light bundle are diffracted and are thereby directed into a common optical axis.

2. The acousto-optic beam combiner according to claim 1, wherein the acousto-optic beam combiner comprises a crystal through which a first and a second mechanical wave having different acoustic frequencies propagate simultaneously, the crystal and the propagation direction of the mechanical waves being oriented, relative to one another and respectively relative to the illuminating light bundles incident into the crystal, in such a way that the first illuminating light bundle is diffracted at the first mechanical wave and the second illuminating light bundle at the second mechanical wave, and they are thereby directed into a common optical axis.

3. The acousto-optic beam combiner according to claim 1, wherein at least one further illuminating light bundle, which does not have the wavelength of the first and second illuminating light bundle and is not diffracted at the mechanical wave, proceeds through the crystal and travels, together with the first and the second illuminating light bundle, into the common optical axis.

4. The acousto-optic beam combiner according to claim 3, wherein the further illuminating light bundle emerges from a second crystal in which a second mechanical wave propagates, the second mechanical wave having an acoustic frequency associated with the wavelength of the further illuminating light bundle, wherein,
- a. the further illuminating light bundle contains a third illuminating light bundle having the further illuminating light wavelength, the third illuminating light bundle being diffracted by the second mechanical wave; or
- b. the further illuminating light bundle contains a third illuminating light bundle and a fourth illuminating light bundle each having the further illuminating light wavelength but a different linear polarization, the third illuminating light bundle and the fourth illuminating light bundle being diffracted by the second mechanical wave.

5. The acousto-optic beam combiner according to claim 4, wherein at least one additional mechanical wave, which has another acoustic frequency associated with an additional wavelength, simultaneously propagates in the crystal or in the second crystal,
- a. at least one additional illuminating light bundle, which has the additional wavelength, being diffracted at the additional mechanical wave and thereby being directed into the common optical axis; or
- b. two additional illuminating light bundles, which each have the additional wavelength and a linear polarization, wherein the linear polarizations of the two additional light bundles are different from one another, being diffracted at the additional mechanical wave and being thereby directed into the common optical axis.

6. A light source for a microscope or a scanning microscope or a confocal scanning microscope having multiple primary light sources and having an acousto-optic beam combiner according to claim 1 that combines the illuminating light bundles of the multiple primary light sources.

7. A microscope or a scanning microscope or a confocal scanning microscope having an acousto-optic beam combiner according to claim 1.

8. The microscope according to claim 7, wherein the beam combiner functions as a main beam splitter that directs illuminating light into an illuminating light beam path in order to illuminate a sample, and that directs a detected light bundle emerging from the sample into a detection beam path having a detector.

9. The microscope according to claim 8, wherein at least one further illuminating light bundle, which does not have the wavelength of the first and second illuminating light bundle and is not diffracted at the mechanical wave, proceeds through the crystal and travels, together with the first and the second illuminating light bundle, into the common optical axis, wherein the further illuminating light bundle emerges from a second crystal in which a second mechanical wave propagates, the second mechanical wave having an acoustic frequency associated with the wavelength of the further illuminating light bundle, wherein
- a. both a portion of the detected light bundle having the illuminating light wavelength and a first linear polarization direction, and a portion of the detected light bundle having the illuminating light wavelength and a second linear polarization direction perpendicular to the first linear polarization direction, are deflected out of the detected light bundle coming from a sample by interaction with the mechanical wave of the crystal, and are thereby removed from the detected light bundle; or
- b. both a portion of the detected light bundle having the further illuminating light wavelength and a first linear polarization direction, and a portion of the detected light bundle having the further illuminating light wavelength and a second linear polarization direction perpendicular to the first linear polarization direction, are deflected out of the detected light bundle coming from a sample by interaction with the mechanical wave of the second crystal, and are thereby removed from the detected light bundle; or
- c. the crystal and the propagation direction of the mechanical wave are oriented, relative to one another and respectively relative to the detected light bundle incident into the crystal, in such a way that the acousto-optic beam combiner deflects, with the mechanical wave, both the portion of the detected light bundle having the illuminating light wavelength and a first linear polarization direction, and the portion of the detected light bundle having the illuminating light wavelength and a second linear polarization direction perpendicular to the first polarization direction, and thereby removes the portions of the detected light bundle having the illuminating light wavelength and either the first or second linear polarization direction from the detected light bundle; or
- d. the second crystal and the propagation direction of the second mechanical wave are oriented, relative to one another and respectively relative to the detected light bundle incident into the second crystal, in such a way that the acousto-optic beam combiner deflects, with the second mechanical wave, both the portion of the detected light bundle having the further illuminating light wavelength and a first linear polarization direction, and the portion of the detected light bundle having the further illuminating light wavelength and a second linear polarization direction perpendicular to the first polarization direction, and thereby removes the portions of the detected light bundle having the further illuminating light wavelength and either the first or second linear polarization direction from the detected light bundle.

10. The microscope according to claim 9, wherein the detected light bundle passes firstly through the crystal and then through the second crystal.

11. The microscope according to claim 8, wherein the beam-guiding components of the beam combiner are arranged and embodied in such a way that the remaining part of the detected light bundle leaves the acousto-optic beam combiner collinearly.

12. The microscope according to claim 7, wherein the acousto-optic beam combiner receives a detected light bundle emerging from a sample and removes from the detected light bundle the portions that have the illuminating light wavelength.

13. Use of a microscope according to claim 7 for investigation of a sample in stimulated emission depletion (STED) microscopy or in coherent anti-Stokes Raman spectroscopy (CARS) microscopy or in stimulated Raman scattering (SRS) microscopy or in coherent Stokes Raman scattering (CSRS) microscopy or in Raman-induced Kerr effect scattering (RIKES) microscopy.

14. Use of an acousto-optic beam combiner according to claim 1 in the context of illumination of a sample or in the context of illumination of a sample in stimulated emission depletion (STED) microscopy or in coherent anti-Stokes Raman spectroscopy (CARS) microscopy or in stimulated Raman scattering (SRS) microscopy or in coherent Stokes Raman scattering (CSRS) microscopy or in Raman-induced Kerr effect scattering (RIKES) microscopy.

15. A beam combiner for a microscope or a scanning microscope, which receives at least a first illuminating light bundle and a second illuminating light bundle and combines them into a collinear output light bundle, the first illuminating light bundle and the second illuminating light bundle having the same illuminating light wavelength but a different linear polarization, wherein the beam combiner is embodied as an acousto-optic beam combiner and is constructed and operated in such a way that by interaction with at least one mechanical wave, both the first illuminating light bundle and the second illuminating light bundle are diffracted and are thereby directed into a common optical axis, wherein the acousto-optic beam combiner comprises a crystal through which a mechanical wave having an acoustic frequency associated with the wavelength of the first and of the second illuminating light bundle propagates, the crystal and the propagation direction of the mechanical wave being oriented, relative to one another and respectively relative to the illuminating light bundles incident into the crystal, in such a way that both the first illuminating light bundle and the second illuminating light bundle are diffracted at the mechanical wave and are thereby directed into a common optical axis.

16. The acousto-optic beam combiner according to claim 15, wherein a. the first illuminating light bundle is linearly polarized and has a linear polarization direction that is the linear polarization direction of the ordinary light with respect to a birefringence property of the crystal; or b. the second illuminating light bundle is linearly polarized and has a linear polarization direction that is the linear polarization direction of the extraordinary light with respect to a birefringence property of the crystal; or c. the linear polarization direction of the first illuminating light bundle or the linear polarization direction of the second illuminating light bundle is arranged in the plane that is spanned by the propagation direction of the mechanical wave and the propagation direction of a detected light bundle.

17. The acousto-optic beam combiner according to claim 15, wherein the acousto-optic beam combiner comprises at least one dispersive optical component that compensates for a spatial spectral division brought about at least in part by the crystal.

18. The acousto-optic beam combiner according to claim 15, wherein the illuminating light bundle directed into the common optical axis encounters an entrance surface of the crystal at an incidence angle of zero degrees.

19. The acousto-optic beam combiner according to claim 15, wherein the crystal comprises an entrance surface for primary light having multiple wavelengths and an exit surface for the illuminating light bundle directed into the common optical axis, which are oriented with respect to one another in such a way that the primary light is couplable into the crystal at least in part as a collinear illuminating light bundle, and the illuminating light bundle directed into the common optical axis leaves the crystal as a collinear illuminating light bundle.

20. A beam combiner for a microscope or a scanning microscope, which receives at least a first illuminating light bundle and a second illuminating light bundle and combines them into a collinear output light bundle, the first illuminating light bundle and the second illuminating light bundle having the same illuminating light wavelength but a different linear polarization, wherein the beam combiner is embodied as an acousto-optic beam combiner and is constructed and operated in such a way that by interaction with at least one mechanical wave, both the first illuminating light bundle and the second illuminating light bundle are diffracted and are thereby directed into a common optical axis, wherein the acousto-optic beam combiner comprises a first crystal through which a first mechanical wave propagates and a second crystal through which a second mechanical wave propagates, the first illuminating light bundle being diffracted by interaction with the first mechanical wave and being directed into the common optical axis, and the second illuminating light bundle being diffracted by interaction with the second mechanical wave and being directed into the common optical axis, and the diffracted second illuminating light bundle passing through the first crystal undiffracted by the first mechanical wave.

* * * * *